W. S. EUBANK.
COUPLING.
APPLICATION FILED APR. 10, 1913.
1,075,703.
Patented Oct. 14, 1913.
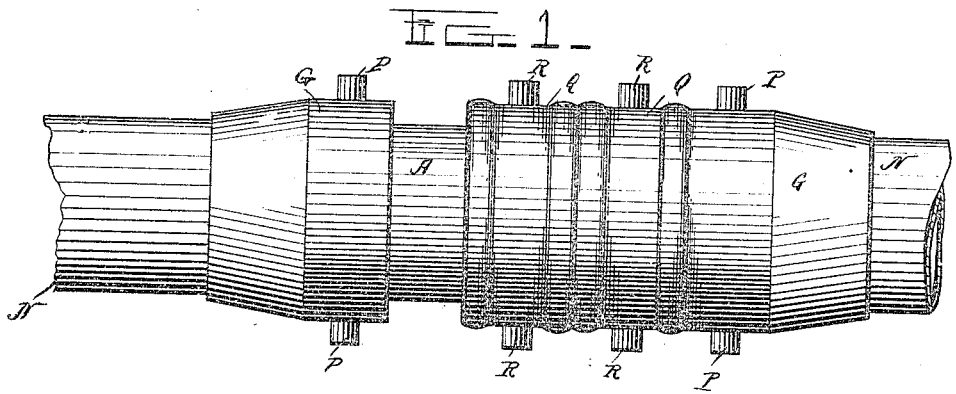
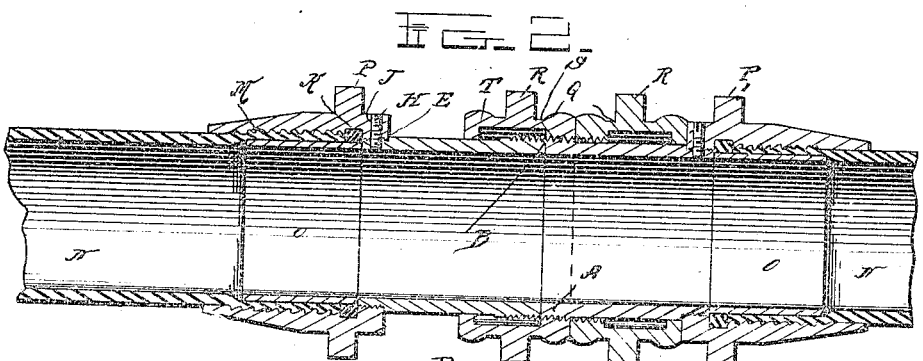
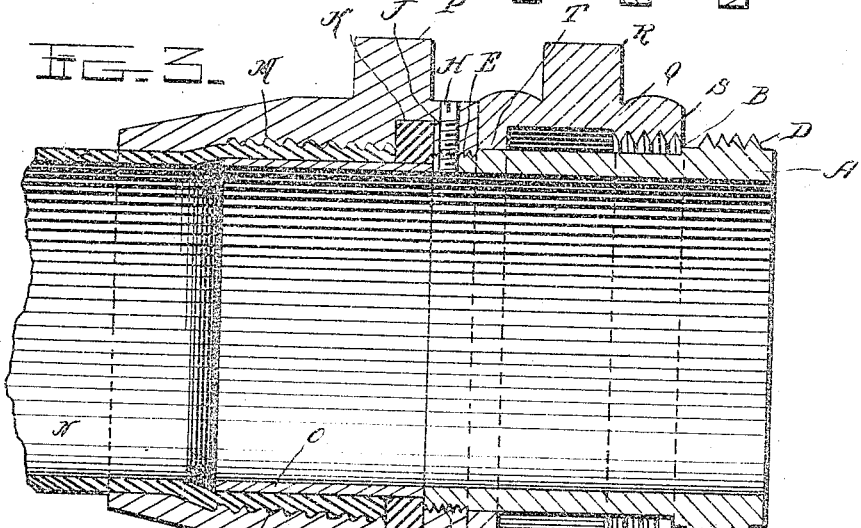
Witnesses
Inventor
William S. Eubank
By
Attorneys

UNITED STATES PATENT OFFICE.

WILLIAM S. EUBANK, OF RICHMOND, VIRGINIA.

COUPLING.

1,075,703.

Specification of Letters Patent.  Patented Oct. 14, 1913.

Application filed April 10, 1913. Serial No. 760,120.

*To all whom it may concern:*

Be it known that I, WILLIAM S. EUBANK, a citizen of the United States, residing at Richmond, in the county of Henrico and State of Virginia, have invented certain new and useful Improvements in Couplings, of which the following is a specification.

My invention relates to improvements in couplings or connections and refers particularly to a coupling capable of use in coupling water, steam or air pipes, but which is particularly designed for coupling hose to the plug or for coupling the sections of the hose together.

One object of my invention is the provision of a coupling which cannot possibly become accidentally detached from the ends of the hose and which will make a water-tight joint and which will be capable of instant coupling and uncoupling, as circumstances require.

Another object of my invention is the provision of a coupling which will withstand the hardest kind of usage, which will be of simple, inexpensive and compact construction, and which from every point of view will be thoroughly efficient, reliable and practical.

With these objects in view, my invention consists of a coupling or connection embodying novel features of construction and combination of parts for service, substantially as disclosed herein.

In order that the detailed construction and the operation of my coupling may be fully understood and its many advantages be appreciated, I have illustrated in the accompanying drawing a hose coupling constructed in accordance with and embodying my invention.

Figure 1 represents a side elevation of my coupling in connected or coupled position. Fig. 2 represents a vertical longitudinal sectional view of the coupling and Fig. 3 represents a vertical longitudinal sectional view on an enlarged scale of one part or member of my coupling.

In view of the fact that the two parts or members which comprise my coupling are identical in construction I will describe particularly only one of the sections, and referring by letter to the drawings: The letter A designates what may be termed a coupling sleeve provided with the shouldered portion B having screw threads D, and said coupling sleeve, upon its other end, is provided with screw threads E, with which engages the screw threads F on the hose clamping thimble G. From this construction it will be understood that the hose clamping thimble G engages the coupling sleeve A, and to intimately connect said parts and secure them against accidental detachment, I provide the securing screw H, which passes through a threaded opening J in the said sleeve and clamping band.

The clamping band is provided on its inner portion adjacent its connecting portion with an annular recess K, in which snugly fits an annular packing or gasket L, and the clamping band is provided with the interior teeth or corrugations M, which when in place upon the hose N bear or wedge against the outer face of the end of the hose, and to positively secure the hose in place against the packing and the corrugated portion of said band, I provide the expansion collar or ring O, which bears against the inner face of the end of the hose, and which when expanded in a suitable manner forces the end of the hose into corrugations of the clamping band and absolutely prevents the ends of the hose from slipping or becoming detached.

It is thus seen that I provide a reliable means for securing the hose and for connecting the coupling sleeve, and the clamping band is provided with suitable projections P, to receive a wrench or spanner, and for the purpose of making the coupling between the sleeves carried by the ends of the hose, I provide the collar Q, which is provided with projections R to receive a suitable implement, and is formed with the coupling thread S, to engage the threads D of the sleeves, and is further provided with a flange T, which limits the movement of the coupling ring or collar and in said movement upon the sleeve is confined between the shoulder portion of the sleeve and the inner face of the clamping thimble, which thus retains the coupling collar in place and enables it to be instantly adjusted.

The construction of my coupling will be readily understood from Fig. 3, and the manner of coupling the ends of the hose will be readily understood from Figs. 1 and 2, and it will be observed that each end of the hose carries the coupling member shown in Fig. 3, and that the construction admits the coupling of the ends of the hose, and also allows connection with the fire plug, and it is evident that the hose is retained in proper position and a watertight joint is insured.

The coupling can be easily applied to the hose and as readily removed when desired, and while the coupling is shown in connection with the ends of hose, I would have it understood that I do not limit myself to its use in this connection, and reserve the right to use the coupling in any situation or for any purpose where it would perform its functions in a proper manner.

I claim:

In a coupling, the combination with the ends of a hose, clamping thimbles having interior corrugations, contiguous annular recesses and interior screw threads, packings in said recesses, coupling sleeves having reduced threaded portions engaging the threads of the thimbles and having shouldered portions formed with screw threads, fastening screws for securing the thimbles rigidly to said coupling sleeves, coupling collars having flanges to engage the shouldered portions of said coupling sleeves and having threaded portions to engage the threads upon the shouldered portions of said sleeves; and expansion rings bearing against the inner faces of the ends of the hose, covering the packings in the recesses of the thimbles and abutting against the coupling sleeves.

In testimony whereof I affix my signature in presence of two witnesses.

WILLIAM S. EUBANK.

Witnesses:
R. L. POLLARD,
R. L. EUBANK.